Oct. 12, 1943.  S. DUNKELSBERG  2,331,666
ZYLONITE PART FOR OPHTHALMIC MOUNTINGS
Filed Aug. 15, 1941
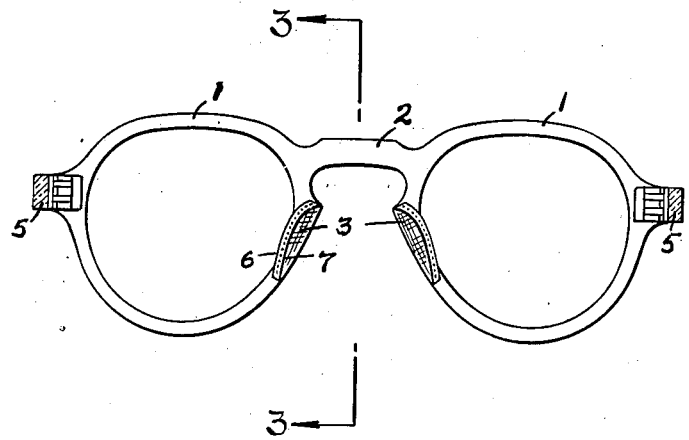
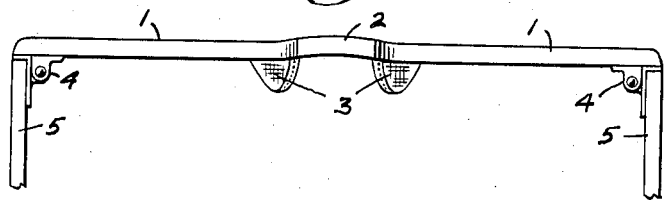
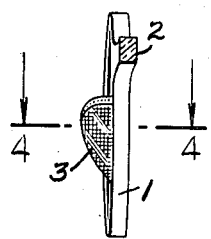
Samuel Dunkelsberg INVENTOR.
BY Thomas Howe
ATTORNEY Patented Oct. 12, 1943

2,331,666

UNITED STATES PATENT OFFICE 2,331,666

ZYLONITE PART FOR OPHTHALMIC MOUNTINGS

Samuel Dunkelsberg, Brooklyn, N. Y., assignor to Tru-Vue Optical Co., Inc., a corporation of New York Application August 15, 1941, Serial No 406,956

4 Claims. (Cl. 88—48)

This invention relates to the reenforcement of zylonite sheets whereby the sheet may be bent or fitted, even while cold, without shattering, cracking, or breaking of the zylonite. This is especially adapted for and has thus far proved of its greatest use in connection with nose guards of ophthalmic mountings, but it may be very useful for and be adapted to use in many other applications.

As is well known spectacles and eye-glasses have been made for many years in whole or in part of zylonite. Such devices are usually supplied with nose guards, that is, supporting parts which bear upon the sides of the nose. Such nose guards are required to be well fitted to the nose of the wearer to both avoid irritation or discomfort from the bearing of the nose guards upon the nose and to properly and firmly secure the lenses in position before the eyes.

Where the nose guards are of metal the matter of their fitting is not a serious problem because, the material usually being thin, they may be readily bent with a pair of pliers to effect the desired fitting. Where the nose pieces are of zylonite, however, this cannot be done as if an attempt is made to bend the zylonite to fit it, as with a pair of pliers, while the zylonite is cold, the zylonite is liable to become cracked, broken or shattered. In order to effect such bending it is necessary to heat the zylonite. This is at best an awkward and untidy operation. Many times suitable heating arrangements may not be available and in the heating of the nose guard other zylonite parts of the article may become inadvertently heated and distorted.

According to the present invention the zylonite nose guard is rendered capable of the desired bending and fitting, while cold, by providing a metal reenforcing means included within the zylonite whereby the zylonite is reenforced and bound together so that the desired bending and fiting with pliers or otherwise may be accomplished while the zylonite is cold and without shattering, breaking or cracking the zylonite.

In connection with the formation of a zylonite nose guard as referred to, there was invented a new and useful sheet of material comprising zylonite and its metal reenforcement and binder from which the nose guards could be cut but which might be used to furnish material for many other structures and purposes, and a new, useful and advantageous method of forming such sheet of reenforced zylonite was also invented.

It may be said, therefore, that one object of the invention is to provide a sheet of material comprising zylonite with a metal reenforcement and binder.

A further object of the invention is to provide a new and advantageous method for producing such reenforced sheet of material.

A further object of the invention is to provide a nose guard for an ophthalmic mounting which shall be of reenforced zylonite so that it may be bent or fitted when cold without injuring the guard.

Other and ancillary objects of the invention will appear hereinafter.

In the accompanying drawing which illustrates the invention—

Fig. 1 is a rear elevation of a pair of spectacles involving the invention, the temples being in cross section;

Fig. 2 is a top plan view of the article of Fig. 1 with the temples broken away;

Fig. 3 is a section on the line 3—3 of Fig. 1;

Fig. 4 is a section on the line 4—4 of Fig. 3; and

Fig. 5 is an enlarged side elevation of a nose guard, partly broken away to show the reenforcement.

Referring to the drawing, the spectacles comprise a "front" or frame including the lens rims 1 integrally connected by a bridge 2, the rims and bridge being of zylonite, and the nose guards 3. Hinged to the frame or front by metal hinges 4 are the temples 5 which may also be of zylonite. Each of the guards 3 is a sheet of reenforced zylonite comprising two layers 6 and 7 of zylonite forming the outer surfaces of the sheet and between which there is embedded a metal wire meshed fabric 8 which reenforces and binds the zylonite so that the guard may be bent or fitted while cold without cracking, breaking or shattering of the zylonite. The metal wire forming the meshed fabric may be of brass or copper or any other suitable metal and the fabric is formed by inter-weaving crossing wires to produce a meshed fabric similar to the well known wire screens.

It will be observed that the wires, crossed at frequent intervals, supply reenforcement and binding against cracking, breaking or shattering of the zylonite, in all directions. The nose guards are firmly secured to the zylonite front or frame by cementing them firmly thereto, the cementing of zylonite to zylonite being well understood in the art.

The nose guards are formed by cutting them or punching them from a sheet of material which is formed by superposing one layer of zylonite upon another zylonite layer with the metal wire meshed fabric between the zylonite layers and a zylonite cementing material (well known in the art) being supplied to the adjacent surfaces of the zylonite layers. The zylonite layers with the metal fabric between them are then subjected to pressure forcing their surfaces together whereby the layers become firmly cemented to each other and the metal fabric is embedded therebetween in the zylonite.

The sheet thus produced is useful not only for forming nose guards but may be used for many other purposes and structures where it is suitable or desired.

The zylonite of the nose guard may be transparent or translucent so that sufficient light may be transmitted to permit the meshed fabric to be seen thereby giving an appearance of knurling or cross-hatching of the surface of the guard which is similar to the surfacing of nose guards of the past and which may give a desirable or conventional appearance to the structure.

While the invention has been illustrated in what is considered its best application it may have other embodiments without departing from its spirit and is not, therefore, limited to the structure shown in the drawing.

What I claim is:

1. In an ophthalmic mounting, the combination with a frame comprising zylonite rims and a zylonite bridge connecting said rims of a nose guard comprising a sheet of zylonite and a metal wire meshed fabric embedded therein, said fabric being within and between the inner and outer surfaces of said guard and flush with the edges of said zylonite, said nose guard being secured to said frame at an angle to said bridge.

2. In an ophthalmic mounting, the combination with a frame comprising zylonite rims and a zylonite bridge connecting said rims of a nose guard comprising layers of zylonite constituting the inside and outside surfaces of said nose guard, said layers being secured together and a metal wire meshed fabric between said layers, said zylonite being light transmitting and said fabric being flush with the edges of said guard and said guard being secured to said frame at an angle to said bridge.

3. In an ophthalmic mounting the combination with a frame at least in part of zylonite and comprising rims and a bridge connecting said rims of a nose guard comprising a sheet of zylonite and a metal wire meshed fabric embedded therein, said nose guard being cemented to the zylonite of said frame, said fabric being confined to said nose guard and being flush with the edges of said zylonite sheet, and said guard being at an angle to said bridge.

4. In an ophthalmic mounting the combination with a frame comprising zylonite lens rims and a bridge extending between said rims, of a nose guard secured to each of said rims below said bridge, and at an angle to said bridge, each of said nose guards comprising a sheet of zylonite and a metal wire meshed fabric embedded therein, said fabric being flush with the edges of said zylonite sheet of said nose guard and said fabric being confined to said nose guard, and each of said nose guards being cemented at an edge to one of said rims.

SAMUEL DUNKELSBERG.